United States Patent
Kuiken et al.

[11] Patent Number: 6,051,481
[45] Date of Patent: Apr. 18, 2000

[54] METHOD AND DEVICE FOR BONDING TWO PLATE-SHAPED OBJECTS

[75] Inventors: Arjen W. Kuiken, Gennep; Erik J. H. M. Teunissen, Wychen, both of Netherlands

[73] Assignee: U.S. Philips Corporation, New York, N.Y.

[21] Appl. No.: 09/196,066

[22] Filed: Nov. 19, 1998

[30] Foreign Application Priority Data

Nov. 26, 1997 [EP]  European Pat. Off. ............. 97203696

[51] Int. Cl.⁷ .......................... H01L 21/30; H01L 21/46; B32B 31/00; B32B 31/16; G05G 15/00
[52] U.S. Cl. ........................ 438/455; 156/349; 156/74; 156/60
[58] Field of Search ............... 438/455; 156/74, 156/228, 312, 349, 60; 464/2, 184

[56] References Cited

U.S. PATENT DOCUMENTS

| 5,770,511 | 6/1998 | Matsumoto | 438/406 |
| 5,800,670 | 9/1998 | Kitano | 156/578 |

FOREIGN PATENT DOCUMENTS

| 07226350A | 8/1995 | Japan | H01L 21/02 |
| WO96/36675 | 4/1996 | WIPO | C09J 5/00 |
| WO9636675 | 11/1996 | WIPO . | |

Primary Examiner—Charles Bowers
Assistant Examiner—Nema Berezny
Attorney, Agent, or Firm—Brian J. Weighaus

[57] ABSTRACT

A method and a device for bonding a first plate-shaped object to a second plate-shaped object with an adhesive. The adhesive is applied to one of the two surfaces of the first object, whereafter said surface of the first object and one of the two surfaces of the second object are pressed together. The plate-shaped objects are rotated at equal rotational velocities about an axis of rotation extending perpendicularly to said surfaces of the objects for at least a time period during which the two objects are being pressed together. In this way, the adhesive present between the two objects spreads homogeneously between the two objects under the influence of the centrifugal force acting on the adhesive, so that a homogeneous, relatively thin and strong layer of adhesive is formed between the two objects. In addition, the pressure with which the objects are to be pressed together is reduced. In a special embodiment, during a first phase, the two objects are moved towards each other at a predetermined relatively low approach speed, and are rotated at a predetermined relatively low rotational speed, and, during a second phase following said first phase, the objects are pressed together with a predetermined compressive force and rotated at a further predetermined relatively high rotational speed. The method and device can be used in the manufacture of SOA-semiconductor devices for bonding a disc-shaped semiconductor substrate to a disc-shaped insulating carrier, such as a glass carrier.

4 Claims, 5 Drawing Sheets

METHOD AND DEVICE FOR BONDING TWO PLATE-SHAPED OBJECTS

BACKGROUND OF THE INVENTION

The invention relates to a method of bonding a first plate-shaped object to a second plate-shaped object by means of an adhesive, in accordance with said method, the adhesive being applied to one of the two sides of the first object, whereafter said side of the first object and one of the two sides of the second object are pressed together.

The invention also relates to a device for bonding a first plate-shaped object to a second plate-shaped object by means of an adhesive, which device is provided with a first holder having a supporting surface for the first object, a second holder having a. supporting surface for the second object, a displacement unit enabling displacement of both holders such that their supporting surfaces face each other, and a pressure unit by means of which the supporting surfaces of both holders can be pressed together.

A method and a device of the type mentioned in the opening paragraph are known from JP-A-07226350. The known method and the known device are used for bonding together two disc-shaped semiconductor substrates by means of an adhesive. The two holders of the known device are arranged in a pressure chamber in which, in operation, the air pressure and air humidity can be controlled. In accordance with the known method, both holders with the semiconductor substrates provided thereon are put in positions, by means of the displacement unit of the known device, in which both semiconductor substrates are arranged so as to be directly adjacent, whereafter both semiconductor substrates are pressed together at a predetermined air pressure and a predetermined air humidity of the pressure chamber by means of the pressure unit of the device. Since both semiconductor substrates are pressed together, the adhesive applied to one of the two semiconductor substrates spreads over a substantial part of the facing sides of the two semiconductor substrates, so that a strong bond between the two semiconductor substrates is achieved.

A disadvantage of the known method and the known device is that the adhesive present between the two semiconductor substrates does not spread completely and homogeneously over the facing sides of the two semiconductor substrates. As a result, using the known method and the known device, a non-homogeneous bond between the two semiconductor substrates is obtained. In addition, the layer of adhesive formed between the two semiconductor substrates has a relatively large thickness, thus limiting the adhesive power present between the two semiconductor substrates.

SUMMARY OF THE INVENTION

It is an object of the invention to provide a method and a device of the type mentioned in the opening paragraphs, which enable to obtain a more homogeneous bond between the two plate-shaped objects and a reduced thickness of the adhesive layer between the two plate-shaped objects in comparison with the known method and the known device.

To achieve this, the method in accordance with the invention is characterized in that, at least for a period of time during which both plate-shaped objects are pressed together, they are rotated at equal rotational velocities about an axis of rotation extending substantially perpendicularly to said sides of the objects.

To achieve the above-mentioned object, the device in accordance with the invention is characterized in that the device is provided with a rotation unit enabling both holders to be rotated at equal rotational velocities.

Since, in accordance with the inventive method, during the time that the two plate-shaped objects are pressed together, they are rotated about the axis of rotation extending substantially perpendicularly to said sides of the objects, a centrifugal force is exerted on the adhesive present between said sides of both objects. Under the influence of the centrifugal force, said adhesive flows uniformly over said sides of the two objects, so that a relatively thin, homogeneous layer of adhesive is formed between the two objects. In this manner, a relatively strong and homogeneous bond between the two objects is achieved. In addition, since the adhesive spreads uniformly under the influence of the centrifugal force, a compressive force used to press together both objects can be limited. Any excess adhesive is flung away from the outer edges of both objects, so that the excess adhesive does not remain on the bonded objects.

A particular embodiment of a method in accordance with the invention is characterized in that the rotational speed of the plate-shaped objects is changed as a function of the time elapsed in the course of the method.

A particular embodiment of a device in accordance with the invention is characterized in that the rotational speed with which both holders can be rotated by means of the rotation unit is adjustable.

In these particular embodiments of the method and the device in accordance with the invention, the spread of the adhesive between the two plate-shaped objects and the flinging-away of any excess adhesive from the outer edges of both objects are favorably influenced by changing the rotational speed of both objects in a suitable manner as a function of the time elapsed in the course of the method.

A further embodiment of a method in accordance with the invention is characterized in that, viewed parallel to the axis of rotation, the plate-shaped objects are moved towards each other at an approach speed which is changed as a function of the time elapsed in the course of the method.

A further embodiment of a device in accordance with the invention is characterized in that an approach speed at which both holders can be moved towards each other by means of the displacement unit is adjustable.

In these further embodiments of the method and the device in accordance with the invention, the spread of the adhesive between the two plate-shaped objects is favorably influenced by changing said approach speed in a suitable manner as a function of the time elapsed in the course of the method.

A still further embodiment of a method in accordance with the invention is characterized in that the plate-shaped objects are pressed together with a compressive force which is changed as a function of the time elapsed in the course of the method.

A still further embodiment of a device in accordance with the invention is characterized in that a compressive force with which the supporting surfaces of the two holders can be pressed together by means of the pressure unit is adjustable.

In these still further embodiments of the method and the device in accordance with the invention, the spread of the adhesive between the two plate-shaped objects is favorably influenced by changing said compressive force in a suitable manner as a function of the time elapsed in the course of the method.

A particular embodiment of a method in accordance with the invention is characterized in that the plate-shaped objects are rotated, during a first phase in which the second object already is in contact with the adhesive applied to the first object, at a predetermined rotational speed and are moved towards each other at a predetermined approach speed, while the objects are rotated, during a subsequent second phase, at a further predetermined rotational speed and pressed together with a predetermined compressive force.

A particular embodiment of a device in accordance with the invention is characterized in that, in operation, during a first phase, the two holders are rotatable by means of the rotation unit at a predetermined rotational speed, and can be moved towards each other by means of the displacement unit at a predetermined approach speed, while during a subsequent second phase, both holders can be rotated by means of the rotation unit at a further predetermined rotational speed and can be pressed together with a predetermined compressive force by means of the pressure unit.

In these particular embodiments of the method and the device in accordance with the invention, adhesive is applied in excess to the first plate-shaped object. During said first phase, the plate-shaped objects are rotated at a relatively low rotational speed and moved towards each other at a relatively low approach speed. In this manner, it is achieved that the adhesive spreads very uniformly over the facing sides of both objects and penetrates as much as possible into any irregularities present on said sides. A relatively large part of the adhesive applied to the first object is flung away from the outer edges of the objects. During said second phase, the objects are rotated at a relatively high rotational speed and pressed together with a relatively large compressive force. In this second phase, it is achieved that the adhesive present between the objects spreads further to form a relatively thin homogeneous layer of adhesive, so that a strong bond between the two objects is achieved. By virtue of the relatively high rotational speed, the necessary compressive force is limited, while the outer edges of the objects to be bonded together remain substantially free of adhesive.

A further embodiment of a method in accordance with the invention is characterized in that, in accordance with the method, a disc-shaped semiconductor substrate and a disc-shaped support for the semiconductor substrate are bonded together. This further embodiment of the method in accordance with the invention is employed in the manufacture of so-called SOA-semiconductor devices (Silicon-On-Anything). In this manufacturing process, the method in accordance with the invention is used to bond a disc-shaped semiconductor substrate to an insulating support of, for example, glass or synthetic resin. Such a disc-shaped semiconductor substrate comprises a large number of identical semiconductor devices which, after the semiconductor substrate has been bonded to the support, are separated from each other. Since the adhesion of each individual SOA-semiconductor device thus obtained should be of a good quality, the bond between the original semiconductor substrate and the support should be as homogeneous as possible. Thus, the advantages of the method in accordance with the invention become particularly manifest if the method is used in the above-described manner to manufacture said SOA-semiconductor devices.

A further embodiment of a device in accordance with the invention is characterized in that the device is provided with a receiving chamber for adhesive, which is arranged around at least one of the holders. Any excess adhesive which, during rotation of two plate-shaped objects which are to be bonded together, is flung away from the outer edges of the objects is caught in the receiving chamber arranged around the relevant holder provided that the rotational speed of both holders is sufficient, so that the flung-away adhesive does not cause contamination of other parts of the device.

Yet another embodiment of a device in accordance with the invention is characterized in that at least one of the two holders is provided with a ring of blades around its supporting surface. The ring of blades provided around the supporting surface of the relevant holder causes, during rotation of the holders with the plate-shaped objects provided thereon, an increase of the air flow along the outer edges of the objects, so that the discharge of excess adhesive from the outer edges of the objects is improved.

A particular embodiment of a device in accordance with the invention is characterized in that, viewed in a direction of rotation of the holders, both holders are coupled to each other. As both holders are coupled to each other, viewed in the direction of rotation, during rotation of the holders with the plate-shaped objects provided thereon, an angular displacement of the objects relative to each other in the direction of rotation is precluded, so that the adhesion between the objects is not disturbed by such an angular displacement.

A further embodiment of a device in accordance with the invention is characterized in that both holders are accommodated in a rotor housing which can be rotated by means of the rotation unit, both holders being coupled to the rotor housing, viewed in the direction of rotation. The use of said rotor housing enables both holders to be coupled to each other in the direction of rotation in a simple and practical manner.

These and other objects of the invention will be apparent from and elucidated with reference to the embodiments described hereinafter.

DESCRIPTION OF THE PREFERRED EMBODIMENTS

Figure 1:
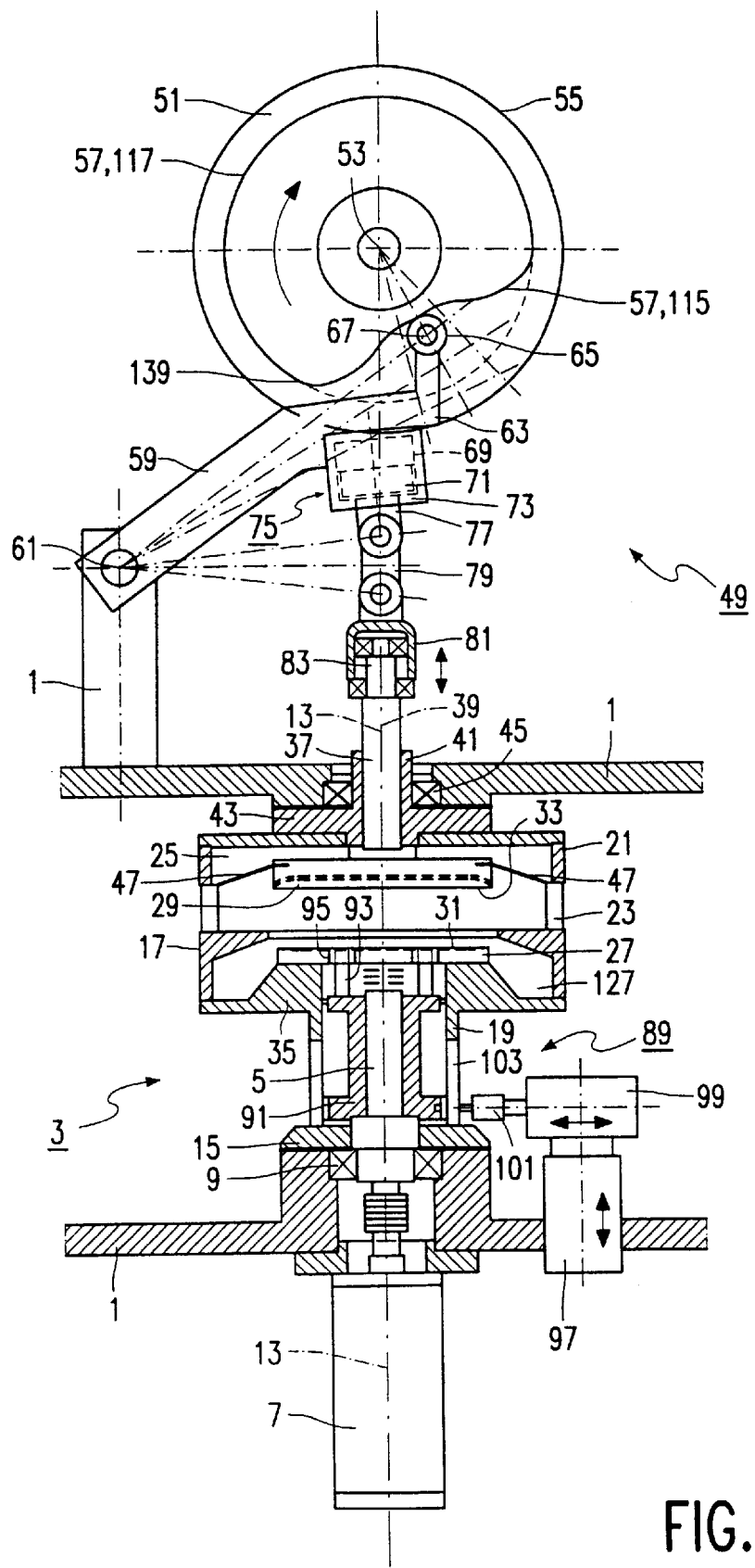
FIG. 1 shows a device in accordance with the invention, by means of which a method in accordance with the invention can be carried out, and FIGS. 2a through 2j schematically show a number of successive steps of a method in accordance with the invention.

FIG. 1 shows a device in accordance with the invention, which comprises a frame 1 which can be located on a floor. The device further comprises a rotation unit 3 comprising a central shaft 5 and an electric motor 7. By means of a ball bearing 9, the central shaft 5 is mounted so as to be rotatable, relative to the frame 1, about a vertical rotation axis 13 and can be driven by means of the motor 7. A flange 15 is secured to the central shaft 5. The rotation unit 3 further comprises a bush-shaped rotor housing 17 which is connected to the flange 15 via a connecting bush 19. A side wall 21 of the rotor housing 17 is provided with a number of apertures 23 via which a chamber 25 situated in the rotor housing 17 is accessible from outside. In the chamber 25 of the rotor housing 17, a first holder 27 and a second holder 29 are arranged. The first holder 27 comprises a supporting surface 31 which extends substantially perpendicularly to the rotation axis 13, while the second holder 29 comprises a supporting surface 33 which extends substantially perpendicularly to the rotation axis 13 and which is directed towards the supporting surface 31 of the first holder 27. The supporting surfaces 31, 33 may be provided with a protective layer, for example, of rubber, to preclude damage to objects to be positioned on said supporting surfaces 31, 33. The first holder 27 is secured to a bottom part 35 of the rotor housing 17. The second holder 29 is secured to a further shaft 37 whose centerline 39 coincides with the rotation axis 13. The further shaft 37 is guided in a bearing bush 41 so as to be axially movable therein, which bearing bush is secured to the rotor housing 17 by means of a further flange 43 and, by means of a further bearing 45, is mounted so as to be rotatable, relative to the frame 1, about the rotation axis 13. The second holder 29 is further suspended in the rotor housing 17 by means of a number of leaf springs 47 extending transversely to the rotation axis 13. By using said leaf springs 47, the second holder 29 and the further shaft 37 connected to said second holder 29 are, viewed in a direction of rotation of the central shaft 5, coupled in a simple and practical manner to the central shaft 5, the rotor housing 17 and the first holder 27, while the second holder 29 and the further shaft 37 connected to said second holder 29 can be axially displaced relative to the first holder 27, thereby elastically deforming the leaf springs 47.

As shown in FIG. 1, the device in accordance with the invention further comprises a displacement unit 49 by means of which the two holders 27, 29 with the supporting surfaces 31, 33 can be moved towards each other. The displacement unit 49 comprises a driving wheel 51 which is mounted so as to be rotatable, relative to the frame 1, about a further rotation axis 53 extending perpendicularly to the rotation axis 13. The driving wheel 51 can be driven by means of a further electric motor, which, for the sake of simplicity, is not shown in FIG. 1, and comprises a cam profile 57 near a circumference 55. The displacement unit 49 further includes an arm 59 which, relative to the frame 1, is mounted so as to be pivotable about a swivel axle 61 which extends parallel to the further rotation axis 53. Near an end 63 of the arm 59, there is a follower wheel 65 which, relative to the arm 59, is mounted so as to be pivotable about yet another rotation axis 67 extending parallel to the further rotation axis 53. The arm 59 engages via the follower wheel 65 the cam profile 57 of the driving wheel 51. For this purpose, the displacement unit 49 comprises customary pretensioning means which are known per se, such as a mechanical spring or a counterweight secured to the arm 59, which are not shown in FIG. 1 for the sake of simplicity. In addition, a cylindrical pressure chamber 69 is secured to the arm 59, which pressure chamber accommodates a piston 71 which can be displaced approximately parallel to the rotation axis 13. The pressure chamber 69 is connected to an adjustable gas-pressure source, which for the sake of simplicity is not shown in FIG. 1. FIG. 1 shows a starting position of the device in accordance with the invention, in which, under the influence of a gas pressure in the pressure chamber 69, the piston 71 is an extreme position facing the rotor housing 17, in which position the piston 71 engages a stop 73 of the pressure chamber 69. The pressure chamber 69, the piston 71 and said adjustable gas-pressure source together form a pressure unit 75 by means of which the supporting surfaces 31, 33 of the two holders 27, 29 can be pressed together, as will be described in greater detail hereinbelow. To the piston 71 there is connected a connecting shaft 77 which is coupled via a double universal joint 79 to a further bearing bush 81 in which an end portion 83 of the further shaft 37 is rotatably mounted. If, from the starting position shown in FIG. 1, the driving wheel 51 is rotated about the further rotation axis 53, the follower wheel 65 follows the cam profile 57, so that the arm 59 is pivoted about the swivel axle 61 and the further shaft 37 with the second holder 29 is moved in the axial direction relative to the rotor housing 17 and the first holder 27. By using the double universal joint 79, it is precluded that, during pivoting the arm 59, the further shaft 37 is subjected to a mechanical load in directions perpendicular to the rotation axis 13. By virtue of the fact that the further shaft 37 is rotatably mounted in the further bearing bush 81, the second holder 29 and the further shaft 37 are simultaneously rotatable about the rotation axis 13 and movable in the axial direction.

Figure 2A:
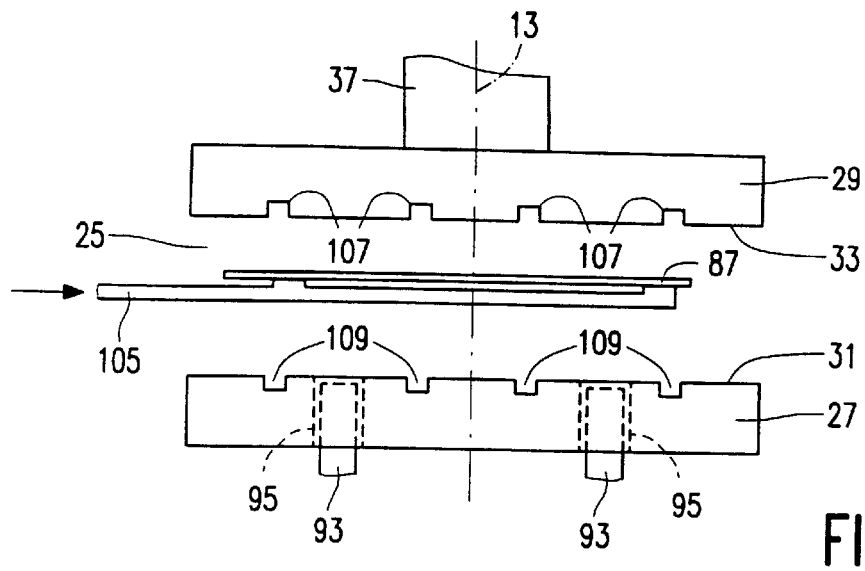
Figure 2B:
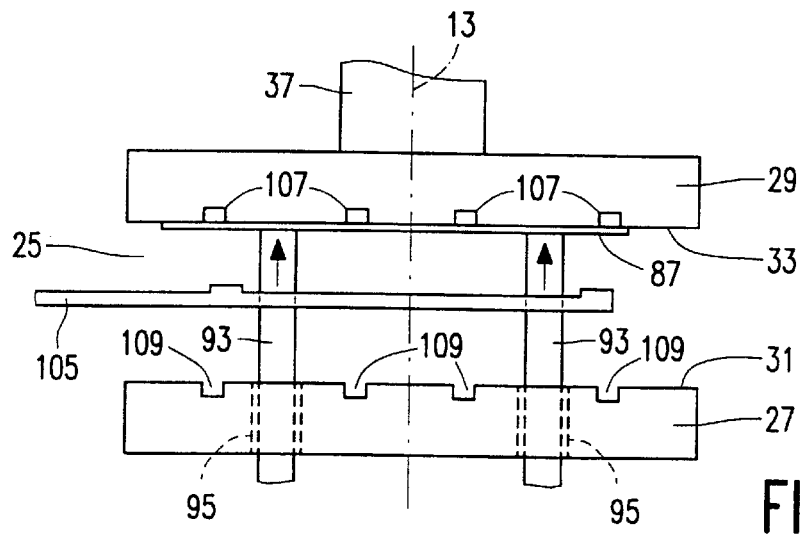
Figure 2C:
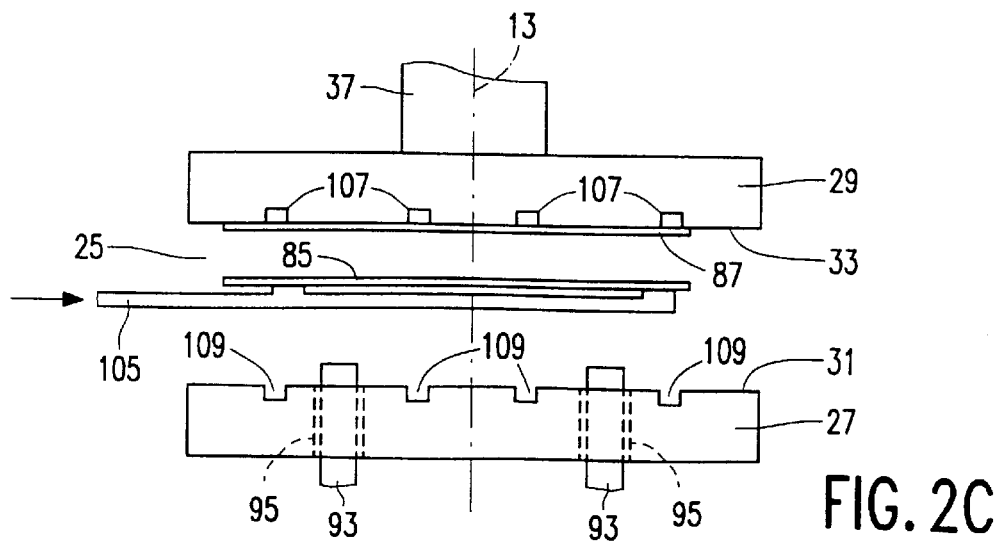
Figure 2D:
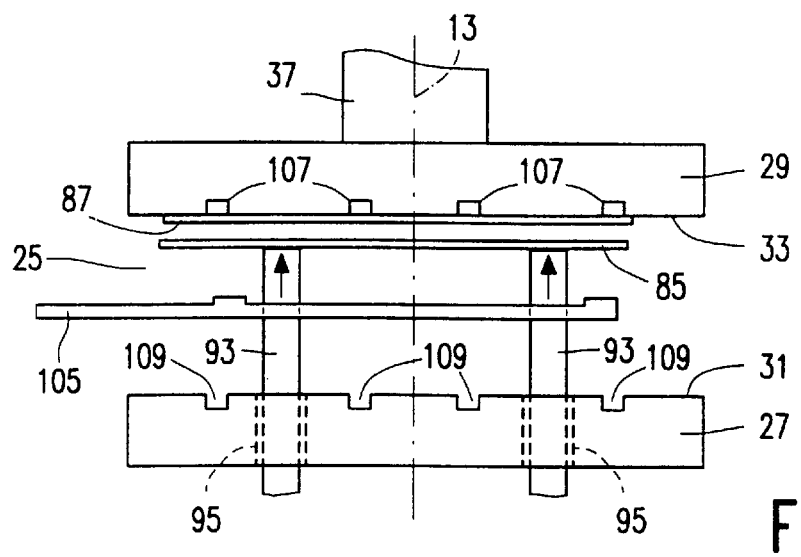
Figure 2E:
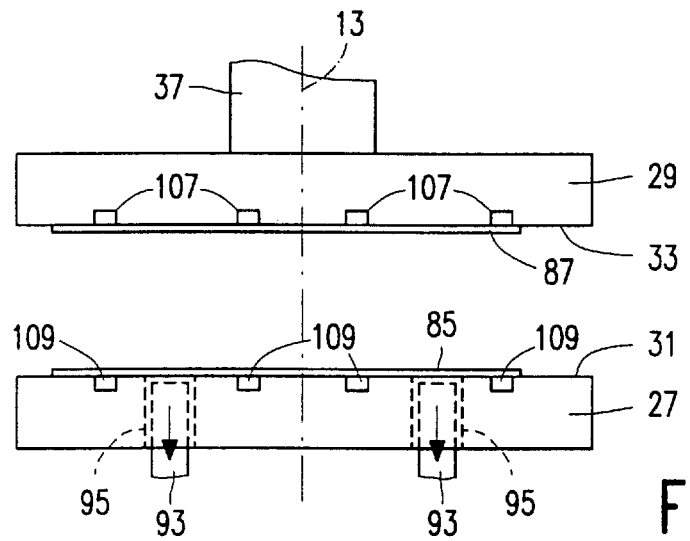

The above-described device in accordance with the invention can suitably be used to carry out an inventive method for bonding a first plate-shaped object 85 to a second plate-shaped object 87 by means of an adhesive. FIGS. 2a through 2j, schematically show that in accordance with the above-mentioned method, the first plate-shaped object 85 is placed on the supporting surface 31 of the first holder 27, while the second plate-shaped object 87 is placed on the supporting surface 33 of the second holder 29. For this purpose, the device is provided with a customary transport unit which is known per se and a lifting mechanism 89, which for simplicity's sake are not shown in FIG. 1. As shown in FIG. 1, the lifting mechanism 89 comprises a bush-shaped support 91 which is guided so as to be axially movable along the central shaft 5. Three supporting pins 93, which are arranged so as to form a triangle, are provided on the bush-shaped support 91; FIG. 1 only shows two of said supporting pins. The supporting pins 93 are axially movably guided in three channels 95 provided in the first holder 27. Further, the lifting mechanism 89 comprises a first actuator 97, which is secured to the frame 1, and a second actuator 99 which can be moved in a direction parallel to the rotation axis 13 by means of the first actuator 97. By means of said second actuator 99, a coupling pin 101 of the lifting mechanism 89 can be moved at right angles to the rotation axis 13 through an aperture 103 which is formed in the connecting bush 19. To place the plate-shaped objects 85 and 87 on the two holders 27 and 29, respectively, first the coupling pin 101 is coupled to the bush-shaped support 91 by means of the second actuator 99. Subsequently, as schematically shown in FIG. 2a, the second plate-shaped object 87 is arranged in the chamber 25 of the rotor housing 17 between the two holders 27, 29 by means of an arm 105 of said transport unit via one of the apertures 23 in the side wall 21 of the rotor housing 17. Next, the bush-shaped support 91 of the lifting mechanism 89 is moved in the axial direction towards the first holder 27 by means of the first actuator 97, so that the second plate-shaped object 87, as schematically shown in FIG. 2b, is lifted from the arm 105 of the transport unit by the supporting pins 93 and pressed against the supporting surface 33 of the second holder 29. In the supporting surface 33 of the second holder 29 there are provided customary vacuum chambers 107 by means of which the second plate-shaped object 87 is secured to the supporting surface 33. Subsequently, the supporting pins 93 are recessed in the first holder 27 by means of the first actuator 97 of the lifting mechanism 89 and, as schematically shown in FIG. 2c, the first plate-shaped object 85 is placed in the chamber 25 of the rotor housing 17 between the two holders 27, 29 by means of said transporting unit via one of the apertures 23 in the side wall 21 of the rotor housing 17. As schematically shown in FIG. 2d, the supporting pins 93 are subsequently moved in the axial direction again towards the second holder 27 by means of the first actuator 97 of the lifting mechanism 89, so that the first plate-shaped object 85 is lifted from the arm 105 of the transporting unit by the supporting pins 93. Subsequently, as shown in FIG. 2e, the supporting pins 93 are recessed again in the first holder 27 by means of the first actuator 97 of the lifting mechanism 89, so that the first plate-shaped object 85 is placed on the supporting surface 31 of the first holder 27. Also in the supporting surface 31 of the first holder 27 there are provided customary vacuum chambers 190 by means of which the first plate-shaped object 85 is secured to the supporting surface 31.

Figure 2F:
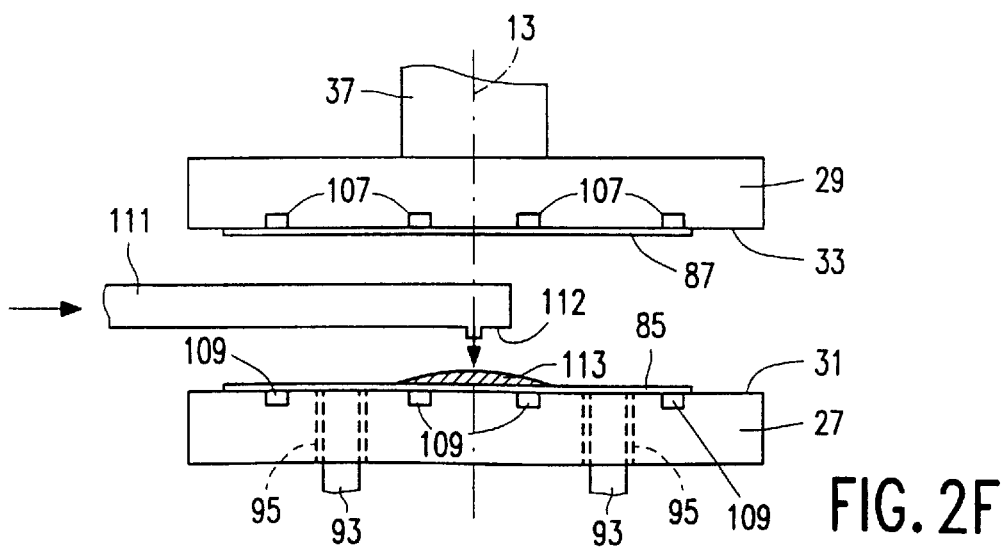
Figure 2G:
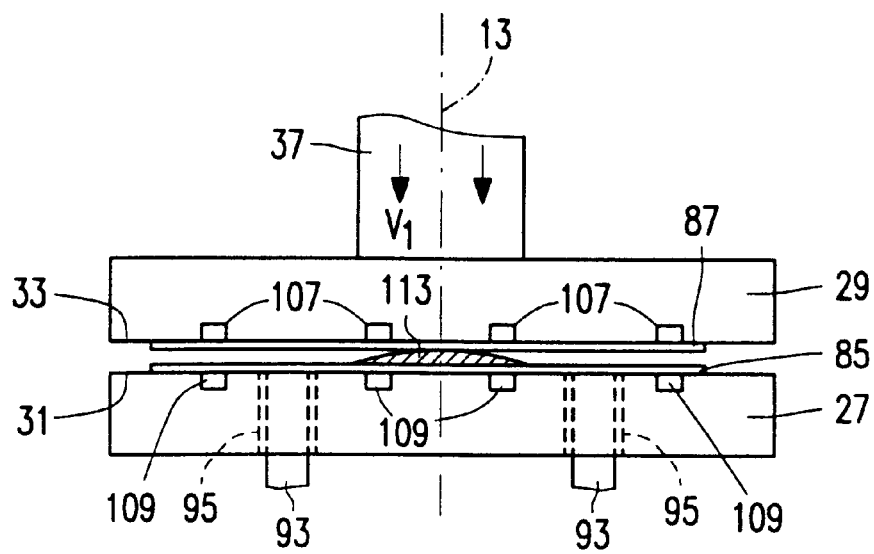
Figure 2H:
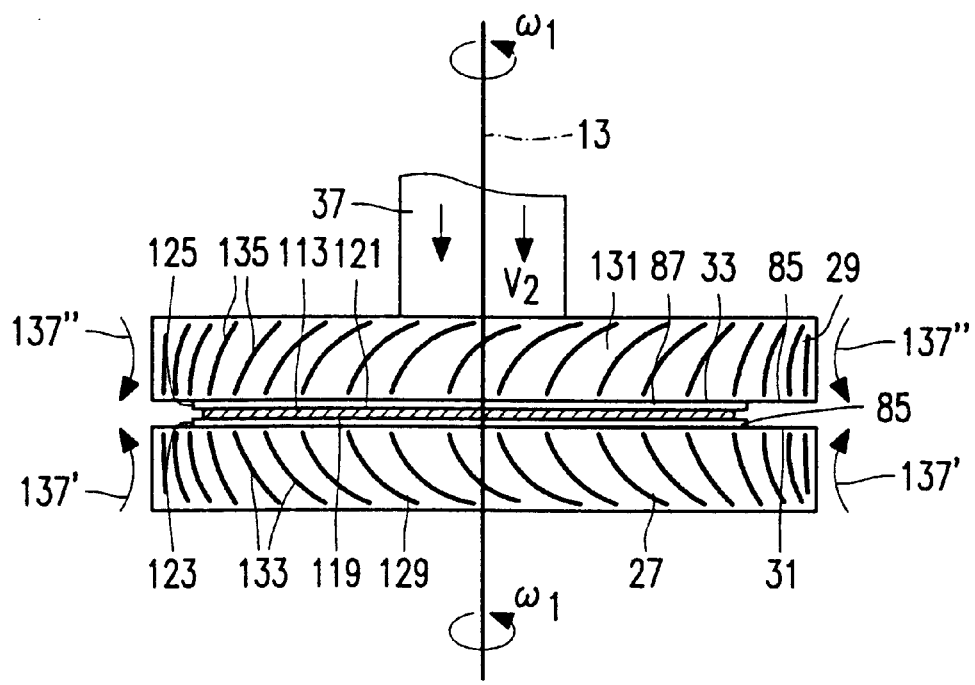

After the plate-shaped objects 85, 87 have been placed, as described above, on the supporting surfaces 31, 33 of the two holders 27, 29 by means of said transporting unit and the lifting mechanism 89, an auxiliary piece 111 for the supply of adhesive is introduced, as schematically shown in FIG. 2f, into the chamber 25 via one of the apertures 23 in the side wall 21 of the rotor housing 17. By means of said auxiliary piece 111, a quantity of adhesive 113 is provided on a central part of the first plate-shaped object 85. It is noted that the best results are achieved if an outlet aperture 112 of the auxiliary piece 111 is arranged at a relatively short distance from the surface of the first object 85 during the supply of the adhesive, so that a continuous flow of adhesive is obtained between the outlet aperture 112 and the object 85. Subsequently, the driving wheel 51 of the displacement unit 49 is rotated from the starting position shown in FIG. 1, so that the follower wheel 65 follows a first relatively steep part 115 of the cam profile 57 and the second holder 29 with the second plate-shaped object 87 is moved at a relatively high velocity $v_1$ to a position, which is schematically shown in FIG. 2g, in which the second plate-shaped object 87 contacts the adhesive 113 provided on the first plate-shaped object 85. The position shown in FIG. 2g indicates the start of a first phase of the bonding process which is schematically shown in FIG. 2h. In said first phase, the holders 27, 29 with the plate-shaped objects 85, 87 are rotated about the rotation axis 13 by means of the rotation unit 3 at a predetermined rotational speed $\omega_1$. In said first phase, the follower wheel 65 follows a second spiral-shaped part 117 of the cam profile 57 which has a relatively small inclination. As a result, the holders 27, 29 with the plate-shaped objects 85, 87 are moved towards each other in said first phase at a relatively small approach speed $v_2$ which is determined by said inclination of the second part 117 of the cam profile 57. Since, in the first phase of the bonding process, the plate-shaped objects 85, 87 are simultaneously moved towards each other and rotated about the rotation axis 13, adhesive 113 present between the objects 85, 87 is very uniformly spread over the facing sides 119, 121 of both objects 85, 87. Since both objects 85, 87 are rotated about the rotation axis 13, a centrifugal force is exerted on the adhesive 113, which causes said adhesive 113 to be very uniformly spread over the facing sides 119, 121 of both objects 85, 87. In this manner, a relatively thin, homogeneous layer of adhesive 113 is formed between the two objects 85, 87. It is noted that by means of the auxiliary piece 111, an excess of adhesive 113 is applied to the first object 85. By virtue thereof, it is achieved that the adhesive 113 penetrates as completely as possible into any irregularities present on said sides 119, 121 of the objects 85, 87. In the first phase, a relatively large part of the applied adhesive 113 is flung away from the outer edges 123, 125 of the objects 85, 87 under the influence of said centrifugal force. At a sufficiently high rotational speed of the holders 27, 29, the flung-away adhesive 113 is caught in a receiving chamber 127 of the device, which is visible in FIG. 1, and which is situated in the rotor housing 17 and arranged around the first holder 27. By using said receiving chamber 127, contamination of the other parts of the device by the flung-away adhesive 113 is precluded in a practical and effective way. As is schematically shown in FIG. 2h, a side wall 129, 131 of each of the two holders 27, 29 is provided with a ring of blades 133, 135 which extends around the supporting surface 31, 33 of the associated holder 27, 29. As schematically shown in FIG. 2h, during rotation, the ring of blades 133 of the first holder 27 generates an air flow 137' which is directed towards the second holder 29, while the ring of blades 135 of the second holder 29 generates an air flow 137" which is directed towards the first holder 27. Thus, during rotation of the two holders 27, 29, both rings of blades 133, 135 generate an increase of the air flow along the outer edges 123, 125 of the objects 85, 87 provided on the holders 27, 29, so that the removal of excess adhesive from said outer edges 123, 125 is improved.

Figure 2I:
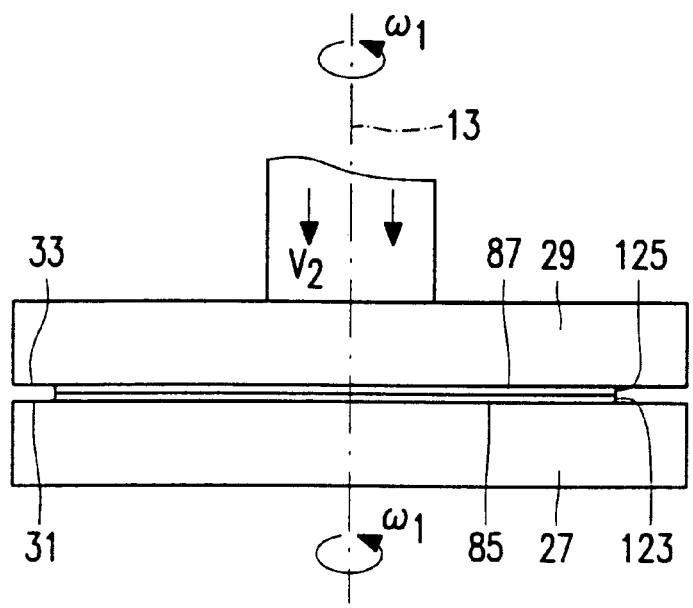
Figure 2J:
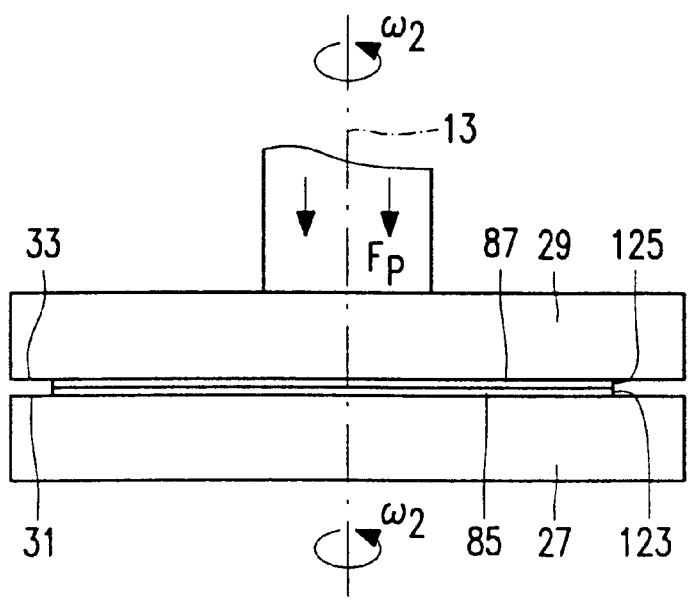

After the follower wheel 65 has reached an end point 139 of the second part 117 of the cam profile 57, the driving wheel 51 is stopped, and the holders 27, 29 with the plate-shaped objects 85, 87 are in a position shown in FIG. 2i, in which a second phase of the bonding process starts, which is schematically shown in FIG. 2j. In said second phase, the holders 27, 29 with the plate-shaped objects 85, 87 are rotated about the rotation axis 13 by means of the rotation unit 3 at a predetermined relatively high rotational speed $\omega_2$, while the plate-shaped objects 85, 87 are pressed together with a predetermined compressive force $F_p$ by means of said pressure unit 75. Towards the end of the first phase of the bonding process, a force exerted by the arm 59 of the displacement unit 49 on the pressure chamber 69 exceeds a gas compressive force exerted on the piston 71 during the first phase, so that said piston 71 becomes detached from the stop 73 and is moved into the pressure chamber 69. In this manner, it is achieved that a compressive force exerted on the second holder 29 during the end of the first phase and during the second phase is determined by the gas pressure in the pressure chamber 69 which can be adjusted by means of said gas-pressure source of the pressure unit 75. During the second phase of the bonding process, the gas pressure set in the pressure chamber 69 is relatively high, so that both objects 27, 29 are pressed together with a relatively large compressive force $F_p$ by the pressure unit 75. In this manner, it is achieved in the second phase of the bonding process that the adhesive present between the objects 85, 87 spreads further so as to form a very thin, homogeneous layer of adhesive, resulting in the formation of a very strong and homogeneous bond between the two objects 85, 87. The relatively high rotational speed of the objects 85, 87 further enhances the spread of the adhesive, so that the necessary compressive force $F_p$ of the pressure unit 75 is limited. Under the influence of the relatively large centrifugal force exerted on the adhesive, substantially all of the adhesive which spreads between the objects 85, 87 near the outer edges 123, 125 of said objects 85, 87, is flung away from the outer edges 123, 125, so that substantially no adhesive remains on the bonded objects 85, 87 and a clean finished product is obtained. As both holders 27, 29 are coupled to each other, viewed in the direction of rotation of the rotation unit 3, it is achieved that both holders 27, 29 with the objects 85, 87 provided thereon are rotated about the rotation axis 13 at equal rotational velocities $\omega_2$. By virtue thereof, during the rotation of the holders 27, 29, an angular displacement of the objects 85, 87 relative to each other is precluded, so that the bond between the objects 85, 87 is not disturbed by such an angular displacement of the objects 85, 87 relative to each other.

After both objects 85, 87 have been bonded together, as described above, in the second phase of the bonding process, the vacuum in the vacuum chambers 107 of the second holder 29 is eliminated, so that the second object 87 becomes detached from the second holder 29. Subsequently, a rotation of the driving wheel 51 from the end point 139 of the second part 117 of the cam profile 57 to the starting position shown in FIG. 1, causes the second holder 29 to be displaced away from the first holder 27 with the bonded objects 85, 87 provided thereon. Subsequently, also the vacuum in the vacuum chambers 109 of the first holder 27 is eliminated, so that the first object 85 becomes detached from the first holder 27. Next, the bonded objects 85, 87 are lifted from the first holder 27 by means of the lifting mechanism 89, and removed from the rotor housing 17 by means of said transporting unit.

The above-described method and device in accordance with the invention can very suitably be used to bond together a disc-shaped semiconductor substrate and a disc-shaped support for said semiconductor substrate in the manufacture of so-called SOA-semiconductor devices (Silicon-On-Anything-semiconductor devices). In the manufacture of such SOA-semiconductor devices, a disc-shaped semiconductor substrate on which a large number of identical semiconductor devices are provided, is bonded to an insulating support of, for example, glass or synthetic resin. After the semiconductor substrate has been bonded to the support, the individual semiconductor devices are separated from each other by means of, for example, a cutting process. The adhesion of each individual SOA-semiconductor device thus obtained should exhibit a very high quality, so that the adhesion of the original semiconductor substrate to the support is very homogeneous and strong. Since, as described hereinabove, the method and the device in accordance with the invention enable a particularly homogeneous and strong bond to be obtained between two plate-shaped objects, said method and device are extremely suitable for bonding semiconductor substrates to insulating supports in the manufacture of SOA-semiconductor devices. It is noted that the method and device in accordance with the invention can also suitably be used for bonding together different types of plate-shaped objects, such as objects made of glass or of a transparent synthetic resin.

In the above-described method and device in accordance with the invention, in the first phase of the bonding process, the plate-shaped objects 85, 87 are rotated about the rotation axis 13 at the predetermined relatively low rotational speed $\omega_1$ and moved towards each other at the predetermined relatively low approach speed $v_2$, while, in the second phase of the bonding process, the plate-shaped objects 85, 87 are rotated about the rotation axis 13 at the predetermined relatively high rotational speed $\omega_2$ and pressed together with the predetermined compressive force $F_p$. It is noted that said predetermined rotational velocities $\omega_1$ and $\omega_2$ the predetermined approach speed $v_2$, and the predetermined compressive force $F_p$ do not have to be constant. For example, the rotational speed $\omega_1$ and the approach speed $v_2$ can be changed as a function of the time elapsed during the first phase of the method, while the rotational speed $\omega_2$ and the compressive force $F_p$ can be changed, for example, as a function of the time elapsed during the second phase of the method. In accordance with the invention, the rotational speed of the plate-shaped objects 85, 87 can also be changed in a different way as a function of the time elapsed during the method, the approach speed of the plate-shaped objects 85, 87 can also be changed in a different way as a function of the time elapsed during the method, and/or the compressive force with which the objects 85, 87 are pressed together can also be changed in a different way as a function of the time elapsed during the method. For this purpose, the device in accordance with the invention may be provided with known, customary means for setting or adjusting the rotational speed of both holders 27, 29, known and customary means for setting or adjusting the approach speed of both holders 27, 29 and/or known and customary means for setting or adjusting the compressive force with which both holders 27, 29 can be pressed together by the pressure unit 75. The way in which the rotational speed of both holders 27, 29, the approach speed of both holders 27, 29, and/or the compressive force of the pressure unit 75 should change as a function of the time elapsed during the method can be, for example, predetermined experimentally. By suitably changing said rotational speed, approach speed and/or compressive force as a function of the time elapsed during the method, the spread of the adhesive between the two plate-shaped objects 85, 87 is favorably influenced, so that the homogeneity of the bond between the two objects 85, 87 is improved.

Finally, it is noted that the invention also comprises methods in which the plate-shaped objects to be bonded together are not rotated when they are moved towards each other; in said methods the objects are not rotated until they are being pressed together. In such an embodiment of the method in accordance with the invention, a smaller quantity of adhesive is employed, which largely spreads between the objects when these objects are moved towards each other. The objects are rotated when they are being pressed together, thereby enhancing the spread of the adhesive and limiting the necessary compressive force. For this reason, the invention comprises methods in which the two plate-shaped objects are rotated at equal rotational velocities at least for a time period during which the objects are pressed together.

We claim:

1. A method of bonding a first plate-shaped object to a second plate-shaped object with an adhesive, said method comprising:

applying the adhesive to at least a side of the first object; rotating said first and second plate-shaped objects at equal rotational velocities about an axis of rotation extending substantially perpendicularly to said sides of the objects; and controlling spreading of the adhesive by varying at least one of (i) the rotational speed of the plate-shaped objects as a function of time as the two objects are brought together and (ii) varying the approach speed of the two objects as the two objects are brought together.

2. A method as claimed in claim 1, characterized in that the plate-shaped objects are pressed together with a compressive force which is changed as a function of the time elapsed in the course of the method.

3. A method as claimed in claims 1, characterized in that the plate-shaped objects are rotated, during a first phase in which the second object already is in contact with the adhesive applied to the first object, at a predetermined rotational speed and are moved towards each other at a predetermined approach speed, while the objects are rotated, during a subsequent second phase, at a different, higher predetermined rotational speed and pressed together with a predetermined compressive force.

4. A method as claimed in claim 1, characterized in that a disc-shaped semiconductor substrate and a disc-shaped support for the semiconductor substrate are bonded together.

* * * * *